Aug. 7, 1951 E. E. CARPENTIER 2,563,395
CALIBRATED OSCILLOSCOPE FOR VOLTAGE MEASUREMENTS
Filed July 16, 1946
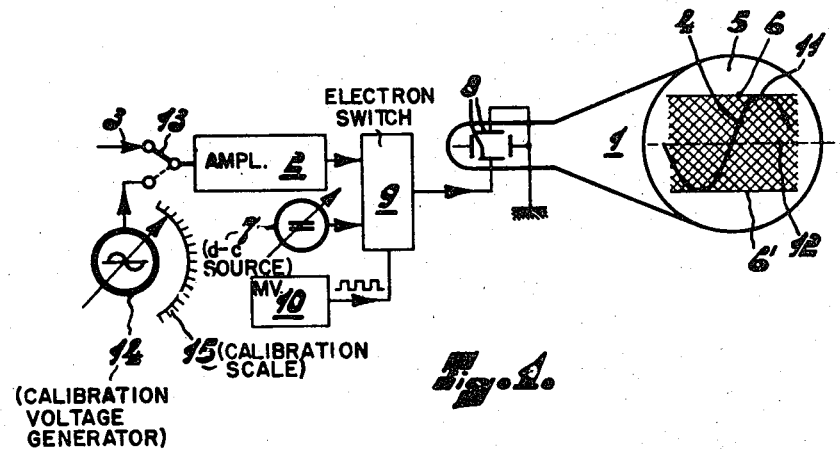
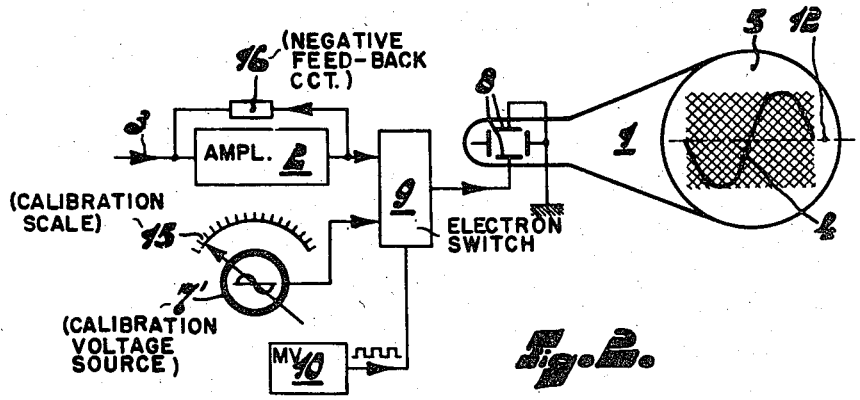
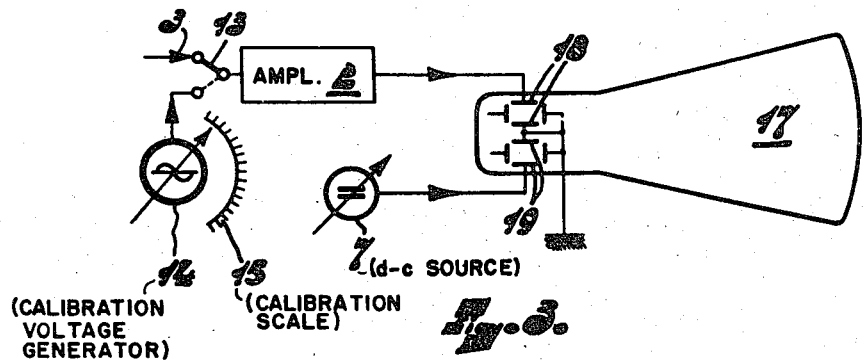
INVENTOR
EDMOND EGBERTUS CARPENTIER
BY
AGENT Patented Aug. 7, 1951

2,563,395

UNITED STATES PATENT OFFICE 2,563,395

CALIBRATED OSCILLOSCOPE FOR VOLTAGE MEASUREMENTS

Edmond Egbertus Carpentier, Eindhoven, Netherlands, assignor to Hartford National Bank and Trust Company, Hartford, Conn., as trustee Application July 16, 1946, Serial No. 684,079
In the Netherlands March 16, 1943

Section 1, Public Law 690, August 8, 1946
Patent expires March 16, 1963

5 Claims. (Cl. 171—95)

1

This invention relates to an oscillograph comprising a cathode-ray tube.

In order to determine the amplitude of a signal on the screen of a cathode-ray tube, a calibration grating constituted by relatively rectangular lines on the outside of the projection wall of the tube has heretofore been used. A drawback involved in using such a grating, i. e. parallax, may be avoided by projecting the calibration grating on to the screen itself and causing the cathode-ray beam to deflect in rapid sequence by means of calibration voltages (or currents) having a known value increasing in a stepwise manner.

However, the equipment required for this method of calibration of the oscillograph is realizable only with great difficulty while in addition the period of time required to project the calibration grating is so great that the possibility of application is severely limited.

It is an object of the invention to provide an improved calibration means for the determination of the amplitude of a signal with an oscillograph.

According to the invention, the device for carrying out amplitude measurements on a signal voltage comprises means for projecting by oscillographic means an adjustable marking voltage simultaneously with the signal and further comprises means for supplying an adjustable calibration voltage of known value to the deflecting members for the signal for the quantitative determination of the place of the mark. The mark projected on the screen, which may in principle be punctiform, is preferably linear. For this purpose, the marking voltage used may be, for example, a unidirectional voltage having an adjustable value, due to which a line capable of being displaced in the direction of amplitude becomes visible on the screen.

Particularly when a unidirectional voltage is used as the marking voltage, the calibration voltage used is preferably an alternating voltage.

In determining, for example, the maximum instantaneous value of a signal the mark is displaced during the reproduction of the signal by controlling the marking voltage until, for example, the marking line is tangent with the signal curve at its maximum; subsequently, instead of the signal voltage, the calibration voltage is supplied to the oscillograph, which is adjusted until the calibration voltage curve is tangent with the adjusted marking line. The readable amplitude of the calibration voltage then corresponds to the instantaneous value to be determined.

2

The marking voltage and the signal voltage may be projected simultaneously in a known manner by supplying the two voltages in rapid sequence to the deflecting members for the signal, for example by means of an electronic switch controlled by switching voltage. In order to obtain as detailed an image as possible of the signal itself, the marking voltage is preferably active during a shorter time than the signal voltage, for example by controlling the electron switch used with the aid of a switching voltage derived from an asymmetrical multivibrator.

In an oscillograph having a cathode-ray tube exhibiting two cathode-ray beams which register on a common screen and which are capable of being controlled independently of each other in the direction of deflection of the phenomenon, the invention may be applied by causing the two cathode-ray beams to be controlled by the signal voltage and the marking voltage respectively.

The invention will be explained more fully by reference to the accompanying drawing showing, by way of example, three advantageous forms of construction of oscillographs according thereto.

Fig. 1 is a schematic drawing of one embodiment of the invention;

Fig. 2 is a schematic drawing of another embodiment of the invention in which no marking voltage is utilized; and Fig. 3 is an embodiment of the invention utilizing a double beam cathode ray tube.

The oscillograph shown in Fig. 1 is substantially constituted by a cathode-ray tube 1 and an amplifier 2, the input circuit of which has supplied to it at 3 a voltage corresponding to a phenomenon to be investigated, which is rendered visible as a curve 4 on screen 5 of tube 1.

To determine the amplitudes of the reproduced phenomenon means are provided for projecting a linear mark 6 simultaneously with the signal. This mark results from the oscillographic reproduction of a unidirectional voltage having an adjustable value, which is taken from a source 7 of unidirectional voltage. This unidirectional voltage and the signal voltage which is a function of a phenomenon under study taken from amplifier 2 are alternately supplied in rapid sequence to the deflecting members 8 of from tube 1 by means of an electronic switch 9 which is controlled by means of a multivibrator 10. Now, the signal voltage and the unidirectional voltage are simultaneously represented on the screen and by controlling the unidirectional voltage of source 7 the mark 6 responsive to the unidirectional voltage may be displaced in the direction of deflection of the signal so as to be tangent, for example at 11, with curve 4. The distance between the marking line 6 and the zero-axis 12 on the screen now corresponds to the maximum instantaneous value of the signal. The latter is measured by supplying, instead of the signal voltage at 3, an auxiliary alternating voltage having an adjustable known amplitude (calibration voltage), which is supplied by a calibration generator 14 to the input circuit of amplifier 2 through a switch 13 while the adjustments of the oscillographs and the remainder of the circuit are unaltered. After the amplitude of the calibration alternating voltage has been adjusted in such manner that the maxima of the images now appearing are again tangent with marking line 6, it is possible to read the instantaneous value of the signal voltage at 3 previously reproduced, on a scale 15 provided in the calibration generator 14. As appears evident, in this method of measuring the amplitude of a signal the amplification factor of amplifier 2 and that of the electronic switch 9, together with the sensitivity of the cathode-ray tube are taken into account in the measurement, so that in general a correction (generally not practicable) of the test result in view of these factors is superfluous.

A possible error in the measurement as a result of a non-linear frequency characteristic of the oscillograph may be avoided by giving the frequency of the calibration voltage a value equal to that of the signal frequency or at least not too much different therefrom. In view thereof the frequency of the calibration voltage is preferably adjustable.

When switch 13 is located in the position shown, the signal voltage and the marking voltage are alternately supplied to the deflecting plates 8 for the signal in accordance with the frequency and wave shape of the switching voltage controlling the electronic switch 9. If the frequency of the switching voltage is a higher harmonic of the time-base voltage, the signal curve as well as the mark become visible on the screen as dotted lines, which is frequently disturbing in practice. Consequently, it is advisable that a harmonic relation between the switching voltage and the time-base voltage be avoided.

In practice, the length of marking line 6 is smaller than that of the signal voltage curve on the screen and hence the average speed of recording of the cathode-ray beam for the mark 6 is smaller than that for curve 4, the light intensity of the signal curve without special means to avoid such intensity contrast will be less than that of the mark, which is undesirable. This disadvantage may be eliminated by arranging the time during which the marking voltage is active to be less than that during which the signal voltage is active, that is, by using an asymmetrical switching voltage for the control of the electron switch.

In the above-described embodiment of the invention the marking voltage used is a unidirectional voltage and the calibration voltage used is an alternating voltage. In principle, it is of course also possible to utilize a unidirectional voltage as the calibration voltage, but it has been found that this results in a decrease in the accuracy of the measurements carried out, and since it is difficult to ascertain whether the calibration voltage has the voltage corresponding to the mark. Therefore it has been found particularly advantageous that the calibration voltage be an alternating voltage having a frequency which differs by at least a factor 10 from the frequency of the time-base voltage and which is not a harmonic of the latter; these measures avoid a luminous fog being obtained on the screen in the manner as is shown in the figure. When using a unidirectional voltage as the calibration voltage, sufficient accuracy may be obtained if the marking voltage used is an alternating voltage which, as before, preferably differs by a factor 10 from the time-base frequency.

Under certain conditions it may be desirable to use not only a single mark but to use over a plurality of marks, for example to carry out measurements on signal voltage curves asymmetrical with respect to the zero-axis. This may be achieved by utilizing a plurality of marks, for example 6, 6', which can be adjusted independently of each other and are obtained by supplying in rapid sequence two marking voltages to the deflecting plates concerned.

A relatively simple form of construction of the oscillograph according to the invention is obtained if the calibration voltage is constituted by the marking voltage as shown, for example, in Fig. 2. In this case the source of marking voltage is constituted by an alternating voltage generator 7'. The amplitude of the alternating marking voltage, which may alternatively be constituted by the switching voltage, is adjustable, as before, but now the value thereof is in addition readable on a scale 15', so that, after the mark has been adjusted, the amplitude value sought can immediately be read on scale 15' which is calibrated for this purpose. As before, the frequency of the generator 7' is preferably given a value which differs by at least a factor 10 (greater or smaller) from the time-base frequency, so that the image shown in Fig. 2 is obtained on the screen.

In the device shown in Fig. 2, amplifier 2 is not included in the measurement. To prevent a calibration of the scale 15', after it has been carried out, from being rendered incorrect, for example due to variations in the supply voltages as a result of the varying amplification factor of amplifier 2, the latter is preferably provided with a negative feedback coupling 16.

Another advantageous form of construction of the oscillograph according to the invention is shown in Fig. 3.

In this case a cathode-ray tube 17 is used exhibiting two cathode-ray beams which can be controlled independently of each other by means of deflecting plates 18, 19 and which are controlled respectively by the signal voltage derived from amplifier 2 and the marking voltage derived from a source 7 of unidirectional voltage. As in the form of construction shown in Fig. 1, the input circuit of amplifier 2 can be switched over by means of a change-over switch 13, to a calibration voltage generator having a scale 15. For the choice of the kind of voltages and, if desired, of the frequency of the marking voltage and the calibration voltage the considerations already mentioned with reference to Fig. 1 apply, while the calibration voltage, after having traversed amplifier 2, may be supplied to the reproducing cascade. In this form of construction the use of a unidirectional voltage as a marking voltage is particularly advantageous in view of the two cathode-ray beams in tube 17 interfering with each other.

It should be noted that in this form of construction switch 9 is superfluous, which contributes to an undisturbed reproduction of the

What I claim is:

1. A device for measuring the amplitude of a signal voltage dependent on a cyclically recurrent signal, comprising an oscillograph having means producing a trace responsive to a first voltage applied thereto and having means producing a trace responsive to a second voltage applied thereto, means providing an adjustable calibration voltage, means providing an adjustable alternating marking voltage, an electrical circuit having input terminals and having an output voltage dependent on voltage applied to said circuit input terminals, means to apply said alternating marking voltage to said first trace producing means, means to selectively apply to said circuit input terminals said signal voltage and said calibration voltage, and means to apply said circuit output voltage to said second trace producing means.

2. A device for measuring the amplitude of a signal voltage dependent on a cyclically recurrent signal, comprising an oscillograph having means producing a trace responsive to a first voltage applied thereto and having means producing a trace responsive to a second voltage applied thereto, means providing a calibration voltage of adjustable amplitude and frequency, means providing an adjustable alternating marking voltage, an electrical circuit having input terminals and having an output voltage dependent on voltage applied to said circuit input terminals, means to apply to said first trace producing means said alternating marking voltage, means to selectively apply to said circuit input terminals said signal voltage and said calibration voltage, and means to apply said circuit oputut voltage to said second trace producing means.

3. A device for measuring the amplitude of a signal voltage dependent on a cyclically recurrent signal, comprising an oscillograph having input terminals and having means producing a trace responsive to a voltage applied thereto, means providing an adjustable calibration voltage, means providing an adjustable alternating marking voltage, an amplifier circuit having input terminals and having an output voltage dependent on voltage applied to said circuit input terminals, means to selectively and repetitively apply to said trace producing means said marking voltage and said circuit output voltage, and means to selectively apply to said trace producing means said said signal voltage and said calibration voltage.

4. A device for measuring the amplitude of a signal voltage dependent on a cyclically recurrent signal, comprising an oscillograph having input terminals and having means providing a trace responsive to a voltage applied thereto, an electrical circuit having input terminals and having an output voltage dependent on voltage applied to said circuit input terminals, means providing an adjustable calibration voltage, a throw switch to selectively directly connect said calibration voltage and said signal voltage to said circuit input terminals, means providing an adjustable alternating marking voltage, and an electron switch connected to selectively and repetitively apply to said oscillograph input terminals voltages dependent respectively on said circuit output voltage and said alternating marking voltage.

5. A device for measuring the amplitude of a signal voltage dependent on a cyclically recurrent signal, comprising an oscillograph having two sets of input terminals and having means providing a trace responsive to the voltage applied to each said set of terminals, means providing an adjustable calibration voltage, means providing an adjustable marking voltage, an electrical circuit having input terminals and output terminals having a voltage dependent on voltage applied to said circuit input terminals, a throw switch having input terminals to one of which is applied said signal voltage and to another of which is connected said calibration voltage means, said switch being connected to said electrical circuit to selectively feed to said circuit said signal voltage and said calibration voltage, said output terminals being connected to one said set of oscillograph input terminals, and an adjustable alternating voltage source connected to the other of said set of oscillograph input terminals.

EDMOND EGBERTUS CARPENTIER.

REFERENCES CITED

The following references are of record in the file of this patent:

UNITED STATES PATENTS

| Number | Name | Date |
| --- | --- | --- |
| 2,122,499 | Stocker | July 5, 1938 |
| 2,286,894 | Browne et al. | June 16, 1942 |
| 2,293,135 | Hallmark | Aug. 18, 1942 |
| 2,428,021 | Grieg | Sept. 30, 1947 |